(12) United States Patent
Sandlin

(10) Patent No.: US 6,513,284 B1
(45) Date of Patent: Feb. 4, 2003

(54) DISPLAY POST WITH SELECTABLE MULTI-FUNCTION CAPABILITY

(76) Inventor: Delbert E. Sandlin, 181E Pembroke Dr., Lake Forest, IL (US) 60045

( * ) Notice: Subject to any disclaimer, the term of this patent is extended or adjusted under 35 U.S.C. 154(b) by 0 days.

(21) Appl. No.: 09/501,019

(22) Filed: Feb. 9, 2000

(51) Int. Cl.[7] .......................... A01G 9/02; F21Y 33/00; B65D 91/00
(52) U.S. Cl. .................. 47/66.6; 47/39; 52/40; 248/146; 40/607; 232/39; 362/253
(58) Field of Search .................... 52/105, 38, 103, 52/582, 40; 47/66.6, 66.1, 65.5, 39, 79; 248/146, 158, 159, 27.8, 176.1; 40/607; 232/39; 362/253, 410, 431

(56) References Cited

U.S. PATENT DOCUMENTS

| | | | | |
|---|---|---|---|---|
| 692,841 | A | * | 2/1902 | Fenton ..................... 52/105 |
| 1,214,319 | A | * | 1/1917 | Kennedy et al. ........... 52/105 |
| 1,338,028 | A | * | 4/1920 | Linehan |
| 1,345,196 | A | * | 6/1920 | Kennedy et al. ........... 52/105 |
| 1,419,152 | A | * | 6/1922 | Lansing et al. |
| 1,435,379 | A | * | 11/1922 | Connery |
| 1,466,465 | A | * | 8/1923 | Belling |
| 2,514,536 | A | * | 7/1950 | Burney |
| 2,534,163 | A | * | 12/1950 | Enghauser |
| 2,720,056 | A | * | 10/1955 | Levy |
| 3,015,024 | A | * | 12/1961 | Charchan et al. |
| 3,293,798 | A | * | 12/1966 | Johnson |
| 3,302,324 | A | * | 2/1967 | MacDonald et al. |
| 3,389,499 | A | * | 6/1968 | Haile |
| 4,250,666 | A | * | 2/1981 | Rakestraw |
| 4,357,772 | A | * | 11/1982 | Amick et al. |
| 4,821,454 | A | * | 4/1989 | Wilds |
| 5,438,797 | A | * | 8/1995 | Lendel |
| D382,511 | S | * | 8/1997 | Azarian |
| 5,675,931 | A | * | 10/1997 | Wasserman |
| 5,678,757 | A | * | 10/1997 | Martin |
| 5,713,514 | A | * | 2/1998 | Eck |
| 5,903,991 | A | * | 5/1999 | Sasse |
| 5,966,868 | A | * | 10/1999 | Cox |
| 6,017,131 | A | * | 1/2000 | Gooins |
| 6,296,180 | B1 | * | 10/2001 | Blizzard |

FOREIGN PATENT DOCUMENTS

| | | | |
|---|---|---|---|
| JP | 54-26525 | * | 2/1979 |
| JP | 54-104021 | * | 8/1979 |
| JP | 5-23053 | * | 2/1993 |

* cited by examiner

*Primary Examiner*—Robert Canfield
(74) *Attorney, Agent, or Firm*—Wood, Phillips, Katz, Clark & Mortimer

(57) ABSTRACT

The combination of a mounting post base, a first accessory that is removably mountable in an operative position to the mounting post base to perform a first function, and a second accessory that is removably mountable in an operative position to the mounting post base in place of the first accessory to perform a second function. The first and second accessories can be selectively mounted to the mounting post base, one in place of the other, to perform a desired function.

26 Claims, 10 Drawing Sheets

DISPLAY POST WITH SELECTABLE MULTI-FUNCTION CAPABILITY

BACKGROUND OF THE INVENTION

1. Field of the Invention

This invention relates to display posts as used for decorative purposes, such as drive markers at the juncture between private drives and public right-of ways and, more particularly, to a universal display post onto which various accessories can be selectively mounted to perform desired functions.

2. Background Art

It is common to see decorative, upright posts mounted adjacent to walks and driveways. In some instances, these posts perform only an aesthetic function. Similar structures are often used to support lights, mail boxes, planters, signage which may incorporate information relating to addresses, party identification, directions, etc.

Typically, each mounting post, whether constructed in situ or as a unit which is brought to an installation site in a partially or fully completed state, is designed with a dedicated function. In the case of a permanent installation, the mounting post may be formed using one, or a combination, of brick, stone, and wood. The mounting post then has a functional component or components, such as a light, mail box, signage, etc., fixedly incorporated therein.

In some settings, non-permanent mounting post structures are desired. As one example, in new developments, such mounting posts may be used to identify builder or realtor information. It is common to see signage installed utilizing a metal frame with projecting stakes which can be pressed into the ground to hold the frame and sign in place. These signs are desirable from the standpoint that they represent a minimal investment and can be readily installed and removed. However, they are generally unsightly and may not convey the desired image, as in an upscale development.

Alternatively, this type of signage may be supported on simple wooden or metal posts which are anchored in the ground. The anchoring can be accomplished as simply as by forming a hole, and compacting dirt around the inserted post end. Alternatively, for a more rigid installation, concrete can be used to fix the inserted post end in the hole. When the utility of the signage is exhausted, the mounting post is removed. Again, this type of mounting system, while having definite functional advantages, may not have the level of aesthetic appeal that is desirable in certain environments. Further, it may be difficult to remove the inserted end of the mounting post from the ground. This may result in the shortcut of cutting off the mounting posts at ground level, which leaves a potentially obstructive component in place.

A still further known alternative, to those discussed above, is the use of an above ground support, which may be nothing more than a flat base made of plywood, or the like, to which a sign mounting frame is attached. This system generally offers the least stability of the above systems and is prone to being tipped or relocated by a significant wind force.

Another problem with non-permanent mounting post installations is that they often must be constructed and installed to meet local ordinances focused on aesthetic and safety issues, with the latter arising from the questionable integrity of non-permanent mounts. As a result of these regulations, a decision may be made to avoid using mounting posts in environments where they are desired. Alternatively, a more permanent construction may be utilized which eventually is removed, involving a potentially significant cost and effort.

A mounting post, with a fixed functional aspect, that is installed on site in a completed, or partially completed, state, may present problems in terms of storage and transportation. For example, a mounting post having a cantilevered arm to support a mail box, if packaged in a square container, leaves a significant amount of dead space in the container. This may result in excessive storage requirements both in inventorying and transporting the item.

A further problem with dedicated types of systems is that purveyors thereof must keep on hand different dedicated configurations incorporating the desired functional features. For example, mounting posts with lights and mounting posts with mail boxes are generally separately displayed in stores and separately inventoried in the stores or warehouses. Inventory control then becomes a significant issue as a purveyor must attempt to predict anticipated demand for each type of system. As additional features are developed, inventory problems are aggravated.

It is also known to adorn mail boxes on mounting posts with foliage. While this may significantly improve the appearance of the mounting post and mail box, the foliage generally involves high maintenance. Winds and warm weather tend to promote evaporation of water in the soil sustaining the foliage. If the water is not frequently replenished, the foliage may become unsightly.

SUMMARY OF THE INVENTION

In one form, the invention is directed to the combination of a mounting post base, a first accessory that is removably mountable in an operative position to the mounting post base to perform a first function, and a second accessory that is removably mountable in an operative position to the mounting post base in place of the first accessory to perform a second function. The first and second accessories can be selectively mounted to the mounting post base, one in place of the other, to perform a desired function.

In one form, the mounting post base has at least first and second stackable parts, with the first mounting post base part having a first height. The mounting post base has a second height that is greater than the first height with the second mounting post base part stacked on the first mounting post base part. The first accessory can be attached to the first mounting post base part with the second mounting post base part separated from the first mounting post base part.

The first accessory may be a bird bath.

The mounting post base may have a downwardly facing surface for engaging a subjacent surface to maintain the mounting post base in an operative position on the subjacent surface.

The mounting post base may have a hollow chamber with a flowable material therein.

The flowable material might be at least one of gravel, fertilizer, sand, soil and water.

Concrete may be poured into the hollow chamber.

The mounting post base may have an external surface and a receptacle for a planting medium at the external surface of the mounting post base.

The planting medium may be provided in the receptacle with foliage in turn planted in the planting medium.

The mounting post base may have a peripheral wall and a hollow chamber within the peripheral wall. An opening in the peripheral wall communicates between the receptacle and the hollow chamber.

A contiguous supply of planting medium may be provided between the receptacle and the hollow chamber.

The combination may further include a reservoir for water within the peripheral wall and a conduit for communicating water from the reservoir to soil within the hollow chamber.

In one form, the mounting post base has a top and bottom and the reservoir is defined by a wall structure which is exposed at the top of the mounting post base.

The first accessory may be an illumination source, with the second accessory being a three-dimensional sculpture. The illumination source may be solar powered.

The combination may further include a solar energy collector.

The first accessory may be a mail box.

In one form, the first accessory consists of a first elongate bar which extends through the peripheral wall on the mounting post base with the first elongate bar in an operative position and there is plaque supported on the first elongate bar with information thereon in the form of at least one of words, numbers, a picture, and a logo.

The second accessory may be a second elongate bar that is shorter than the first elongate bar and extends through the peripheral wall on the mounting post base in place of the first elongate bar.

In one form, one of the accessories is a plaque with information thereon in the form of at least one of words, numbers, a picture, and a logo.

An illumination source may be provided for the plaque.

In one form, an access opening is provided through the peripheral wall of the mounting post base and there is a closure element that is movable selectively between a) an open position wherein access to the hollow chamber can be gained through the access opening and b) a closed position.

A receptacle may be provided which can be selectively placed into and removed from the hollow chamber through the access opening.

The first accessory may be an ashtray.

The combination may further include a switch for activating a remotely situated device.

The combination may further include a sound transmitter.

The combination may further include a transmitter for generating a signal to a location remote from the mounting post base.

The combination may further include an anchoring element on the mounting post base to which the end of an elongate element can be tied.

The combination may further include a sensor which is capable of detecting the presence of an object in the vicinity of the mounting post base.

A speaker system may project a prerecorded message as an incident of detecting the presence of an object in the vicinity of the mounting base.

An illumination source may be provided on a flexible element, which allows light from the illumination source to be selectively directed around the mounting post base.

In one form, the combination further includes a processor with data that can be selectively accessed by a user at the mounting post base.

In one form, one of the accessories consists of at least one arm that is removably attached to the mounting post base and which in an operative position on the mounting post base defines in conjunction with the mounting post base a crucifix shape.

DETAILED DESCRIPTION OF THE DRAWINGS

The present invention is directed to a universal mounting post base at 10 to which various accessories, as hereinafter described in detail, can be removably and/or interchangeably mounted. The mounting post base 10 has an overall squared shape defined by a peripheral wall structure 12. While it is not necessary that the mounting post base 10 have the squared shape shown, the shape is desirable in that it defines flat, exposed, front and rear surfaces 14, 16, respectively, and oppositely facing side surfaces 18, 20, for facilitated mounting of the accessories.

Figures 2, 3:
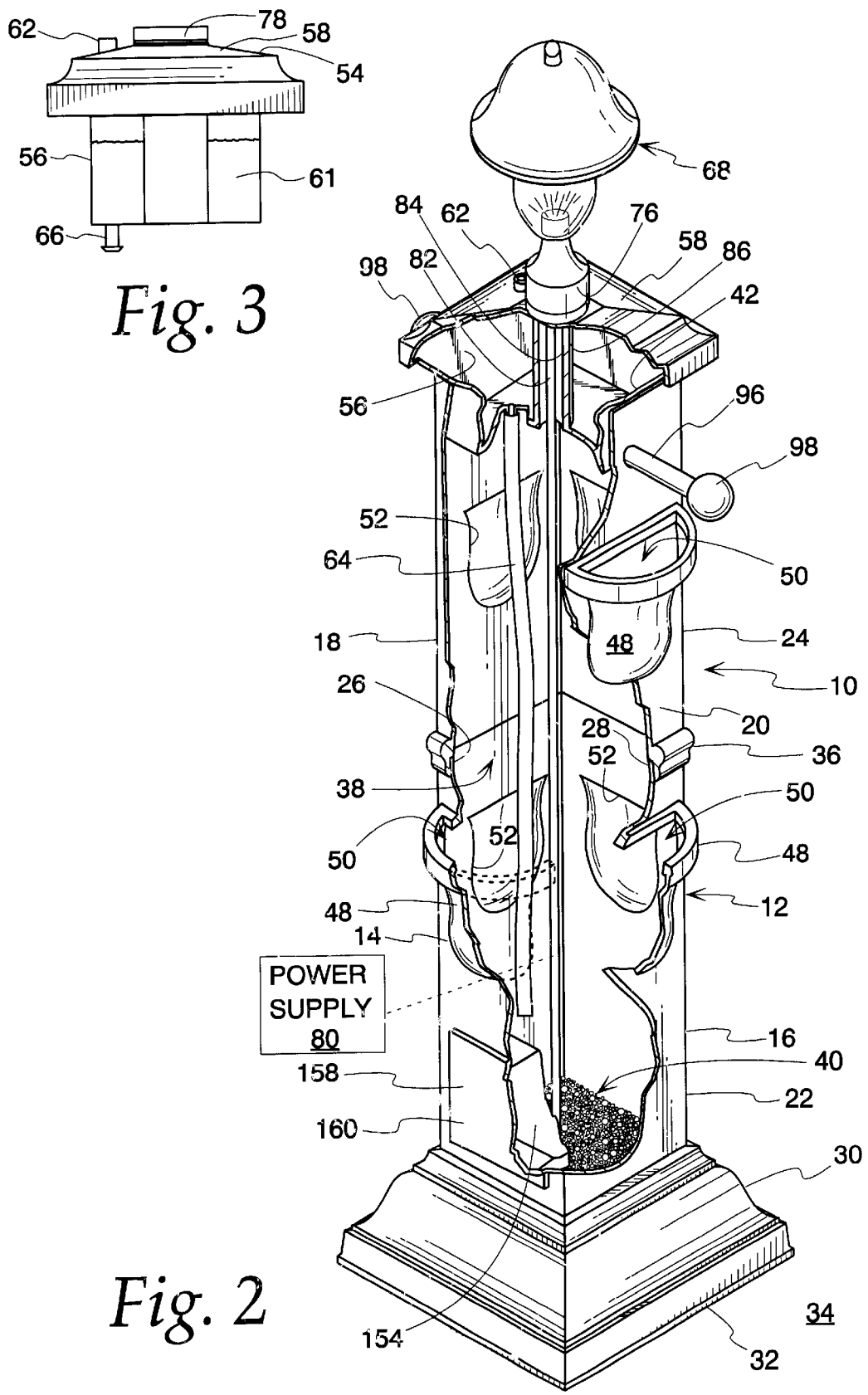
FIG. 2 is a view as in FIG. 1 partially broken away to show a hollow chamber within a peripheral wall on the mounting post base within which a flowable material is placed to add weight to the mounting post base.
FIG. 3 is an elevation view of a module which defines the water reservoir.

The mounting post base 10 is preferably formed with stackable parts. In this case, there are two such parts shown, a lower part 22 and an upper part 24. As shown in FIG. 2, the upper part 24 may have a receptacle 26 that is complementary to the upper edge 28 of the lower part 22, to allow the lower and upper parts 22, 24 to be press fit, one within the other.

While two such cooperating base parts 22, 24 are shown, virtually any number of base parts can be employed. Still further, the combined height defined by the lower and upper base parts 22, 24 may be defined by a single piece, or by panels that are joined in conventional fashion to produce an upright columnar form.

The bottom of the lower base part 22 is adorned with a molding 30 that, in addition to its aesthetic function, increases the footprint of the mounting post base 10. The molding 30 defines a downwardly facing surface 32 that can be placed facially against a subjacent surface 34 upon which the mounting post base 10 is mounted in its operative position. An optional intermediate molding 36 is provided for aesthetic purposes and, in the case of a multi-part base construction, is functional to cover the seam between the joined base parts 22, 24.

The peripheral wall structure 12 bounds a hollow chamber 38. The hollow chamber 38 can serve multiple purposes. As shown in FIG. 2, a ballast 40 can be introduced to the hollow chamber 38 to stabilize the mounting post base 10 in its operative position. The ballast 40 may consist of sand, gravel, concrete, metal pieces, stone, or the like, which lends itself to introduction into the hollow chamber 38, as through a top opening 42 in the peripheral wall structure 12.

Figure 1:
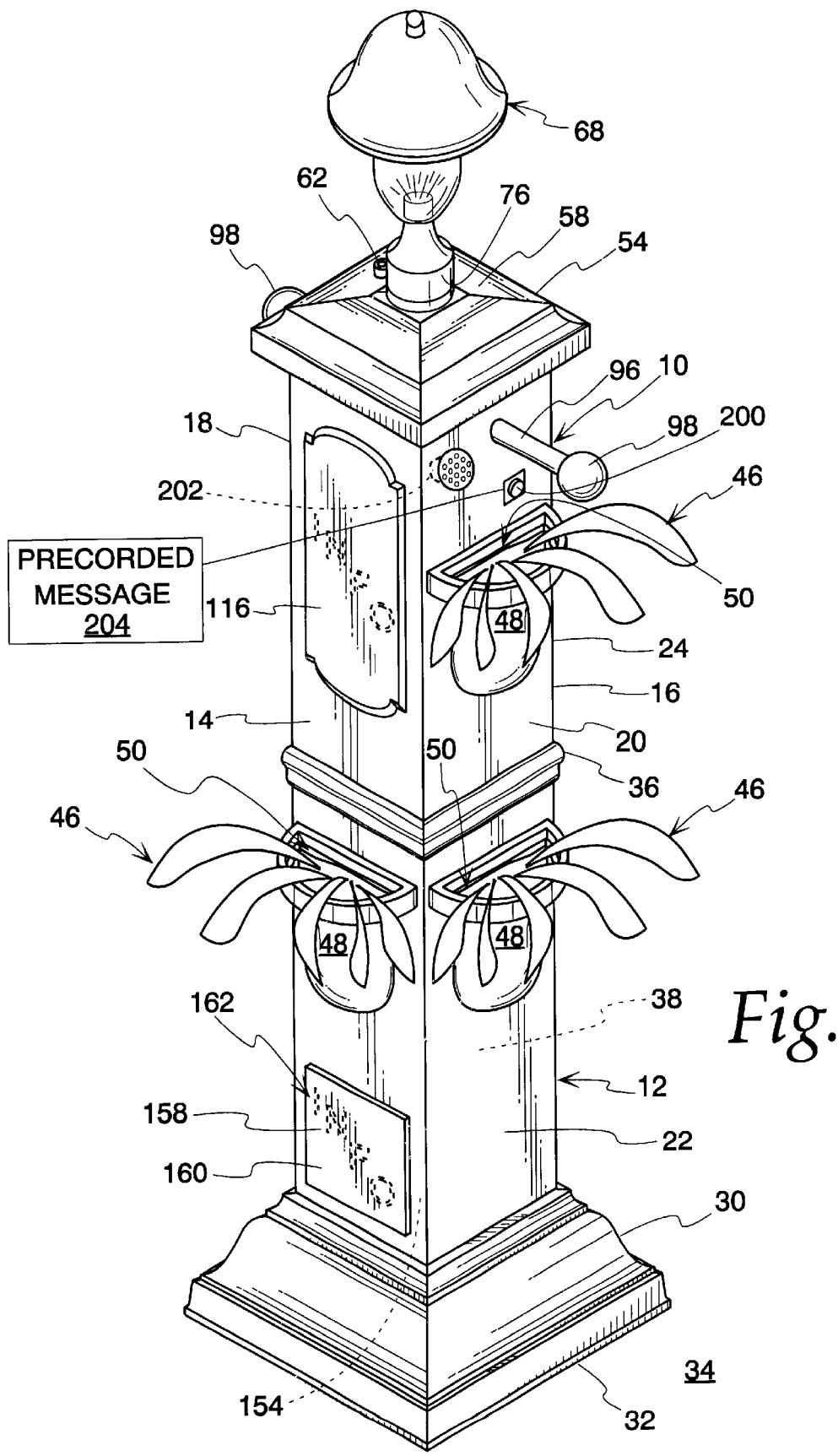
FIG. 1 is a perspective view of a mounting post base, according to the present invention, including different accessories that are removably mounted thereto including, in this configuration, a top illumination source, a first elongate bar, informational plaques, a reservoir for a water supply, and a bottom closure element.
Figure 7:
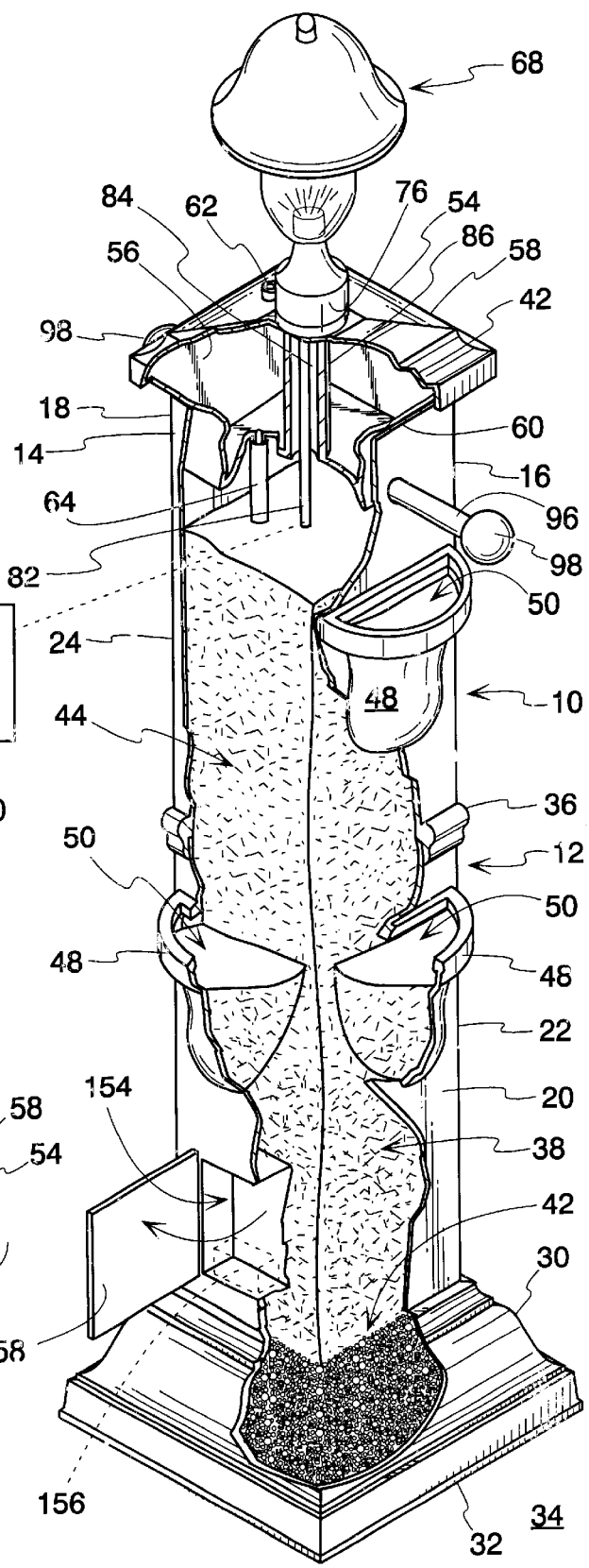
FIG. 7 is a view as in FIG. 1 broken away and showing a planting medium within the hollow chamber.

The hollow chamber 38 is shown in FIG. 7 filled with a planting medium 44 that may be one, or a combination of, soil, fertilizer, peat moss, etc. in which foliage, such as the type shown at 46 in FIG. 1, is commonly planted.

The foliage 46 is located in planters 48 at different locations around the peripheral wall structure 12. Each planter 48 bounds an external receptacle 50, each of which communicates through an opening 52 through the peripheral wall structure 12 to the hollow chamber 38. By filling the hollow chamber 38 and receptacles 50 with the planting medium 44, foliage 46 in the planters 48 can be deeply rooted. The number of planters 48, and the configuration thereof, are design considerations and might vary considerably from that shown.

The top opening 42 is closed by a watering module 54. The module 54 consists of a cup-shaped wall 56 which defines a reservoir for water and which is closed by a decorative cover 58. With the watering module 54 in its operative position, the cover 58 abuts to the upper edge 60 of the peripheral wall structure 12, with the cup-shaped wall 56 nested in the hollow chamber 38. A supply of water 61, or other growing liquid in the watering module 54, can be replenished through a filler spout 62 extending upwardly through the cover 58.

Liquid is discharged from the watering module reservoir through a conduit 64 connected to the module 54 by a fitting 66. The conduit 64 may be provided with one or more discharge openings, or may be porous so that the liquid wicks therethrough and seeps into the planting medium 44.

The cover 68 is configured to interchangeably mount a decorative illumination source 68 and one of potentially a multitude of sculptures 70, 72, which are merely decorative without any illumination capability. The shape of the illumination source 68 is a design consideration, and could vary considerably from that shown.

The illumination source 68 has a depending, annular skirt 76 which surroundingly, frictionally engages an upright projection 78 on the cover 58. As seen in FIGS. 2 and 7, the illumination source 68 can be powered from a conventional supply 80. A conduit 82 for wiring extends from the projection 78 through an opening 84 defined by a sleeve 86 on the watering module 54, and through the hollow chamber 38.

Figure 10:
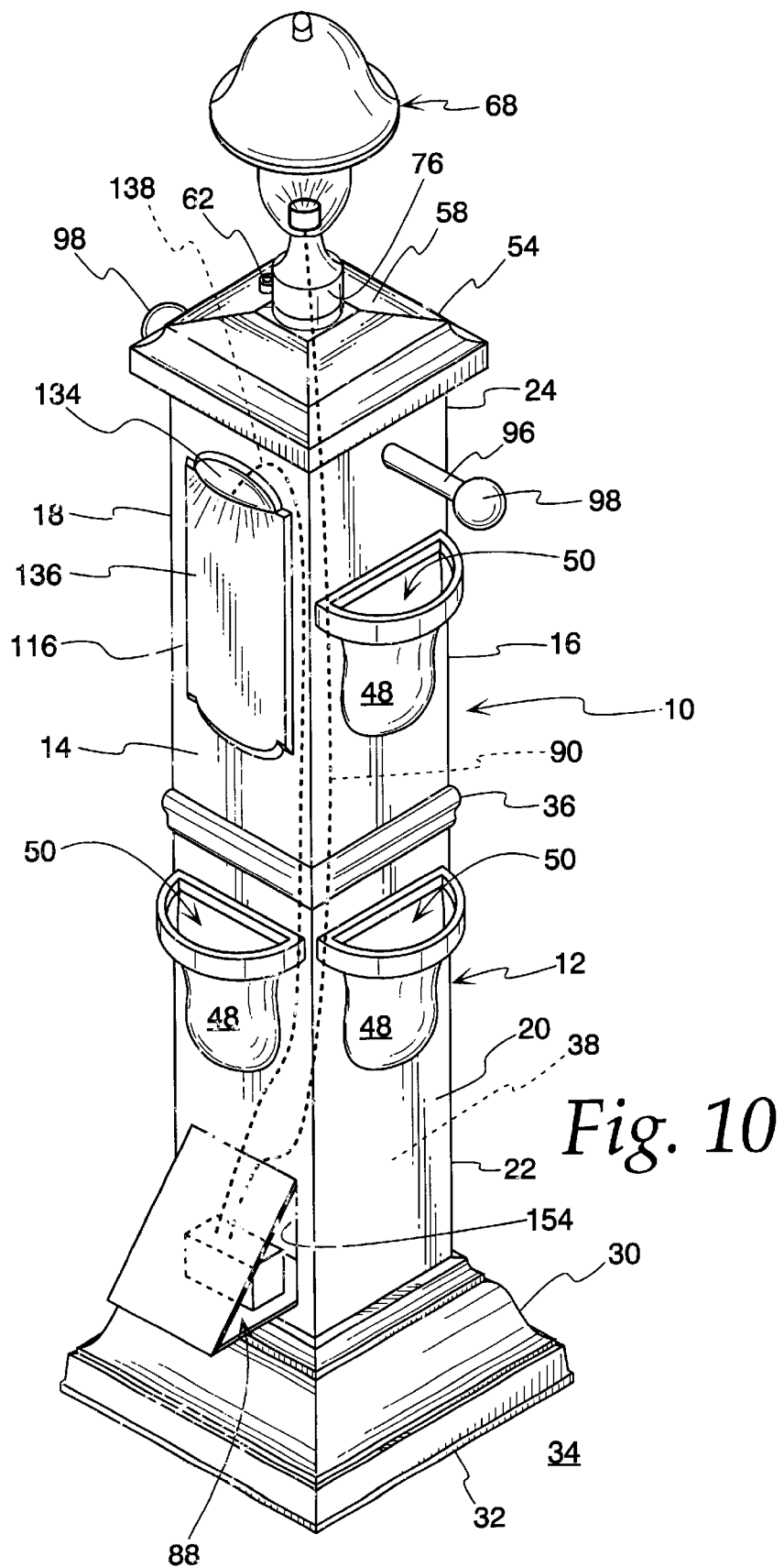
FIG. 10 is a view as in FIG. 1 with the upper informational plaque illuminated and with a solar collector mounted in place of the bottom closure element for powering the top illumination source and the illumination source for the upper informational plaque.

Alternatively, as shown in FIG. 10, the illumination source 68 can be solar powered. A solar collector 88 is provided at the bottom of the mounting post base and is electrically connected to the illumination source 68 by a wire 90 passed through the hollow chamber 38 and the watering module 54 within the conduit 82.

Figure 9:
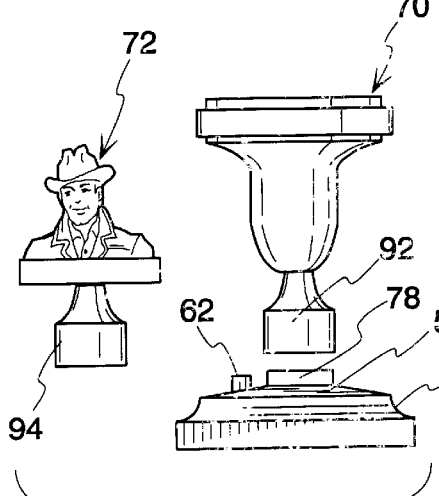
FIG. 9 is an exploded perspective view showing the top of the mounting post base with one three-dimensional sculpture substituted for the illumination source and further showing an alternative sculpture which can be substituted for the one three-dimensional sculpture.
Figure 11:
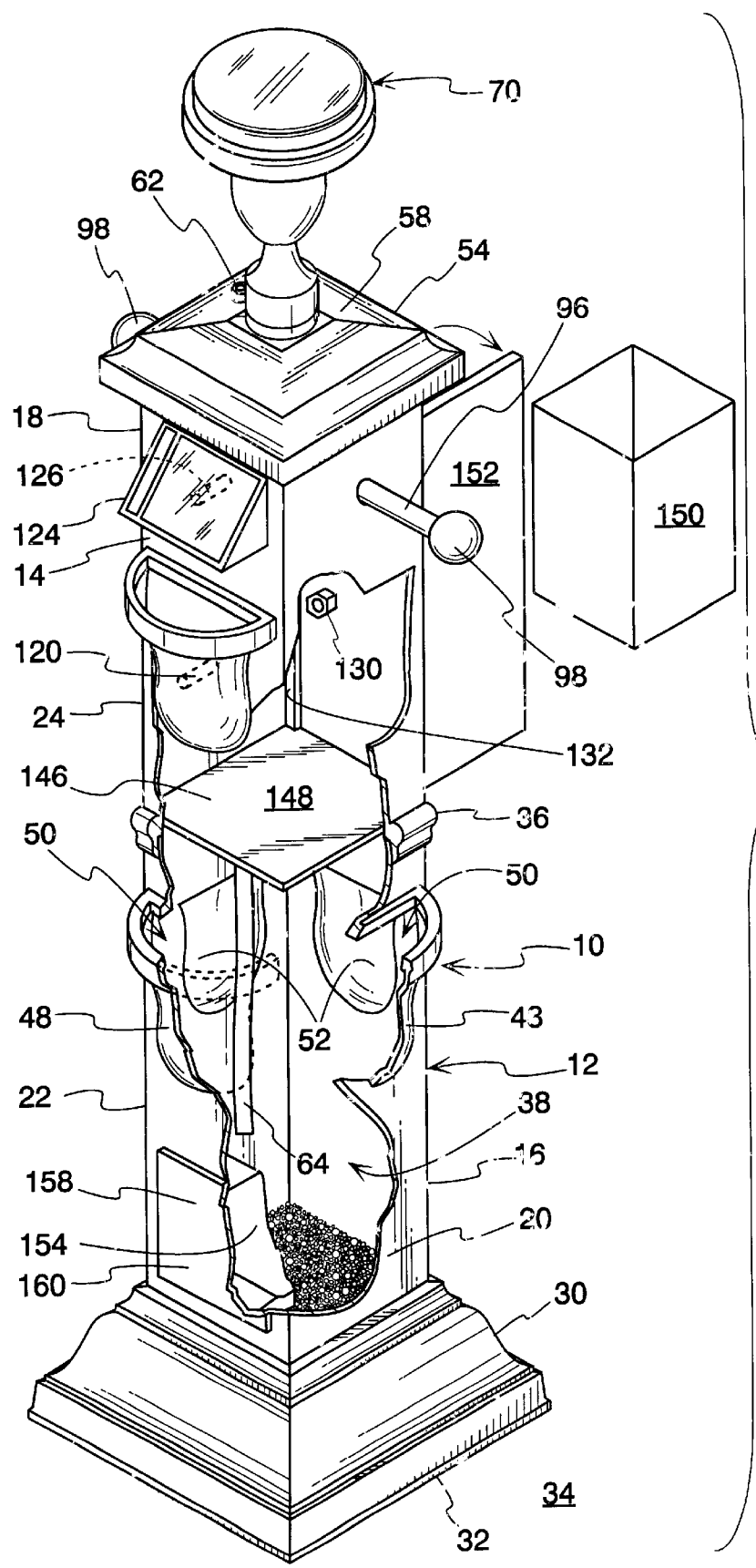
FIG. 11 is a view as in FIG. 5 with the three-dimensional sculpture substituted for the illumination source, a processor with data that can be selectively accessed by a user substituted for the smaller upper informational plaque, and showing a second closure element which may be used to access the internal chamber to allow placement of a receptacle therewithin upon a shelf.

In FIGS. 9 and 11, one form of sculpture 70 is shown which is mountable to the mounting post base 10 in place of the illumination source. 68. The sculpture 70 has a depending skirt 92 to surroundingly, frictionally engage the projection 78 to maintain the sculpture 70 in the operative position of FIG. 11. The sculpture 70 has an arbitrary shape. Other sculptures, such as the sculpture 72 in FIG. 9, could be used. The sculpture 72 is mounted through a depending skirt 94 to the projection 78.

In FIGS. 1, 2, 5, 6, 7 and 10, a decorative, elongate bar 96 is shown projected through the peripheral wall structure 12 so that its ends are exposed beyond the side surfaces 18, 20. Decorative caps 98 are mounted at each end of the bar 96. The bar 96 may be used to hang objects therefrom or may be provided strictly for aesthetic purposes.

Figure 4:
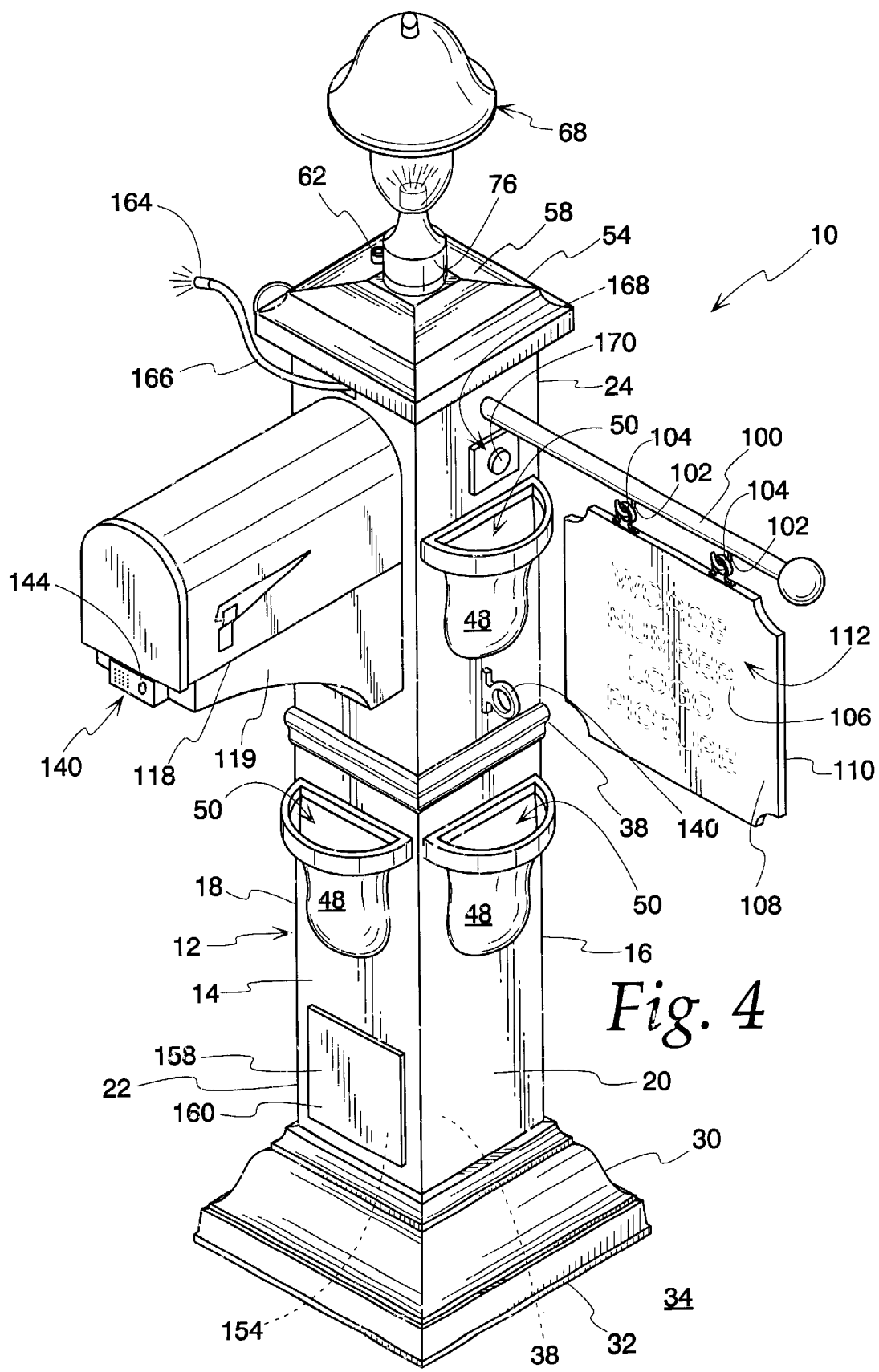
FIG. 4 is a view as in FIG. 1 with a mail box substituted for the informational plaque in FIG. 1, and a second elongate bar substituted for the first elongate bar in FIG. 1, and showing a transmitter for generating a signal to a location remote from the mounting post base, an anchoring element to which the end of an elongate element can be tied, an illumination source on a flexible element to allow controlled direction of light generated thereby, and a sensor which is capable of detecting the presence of an object in the vicinity of the mounting post base, on the mounting post base.
Figure 5:
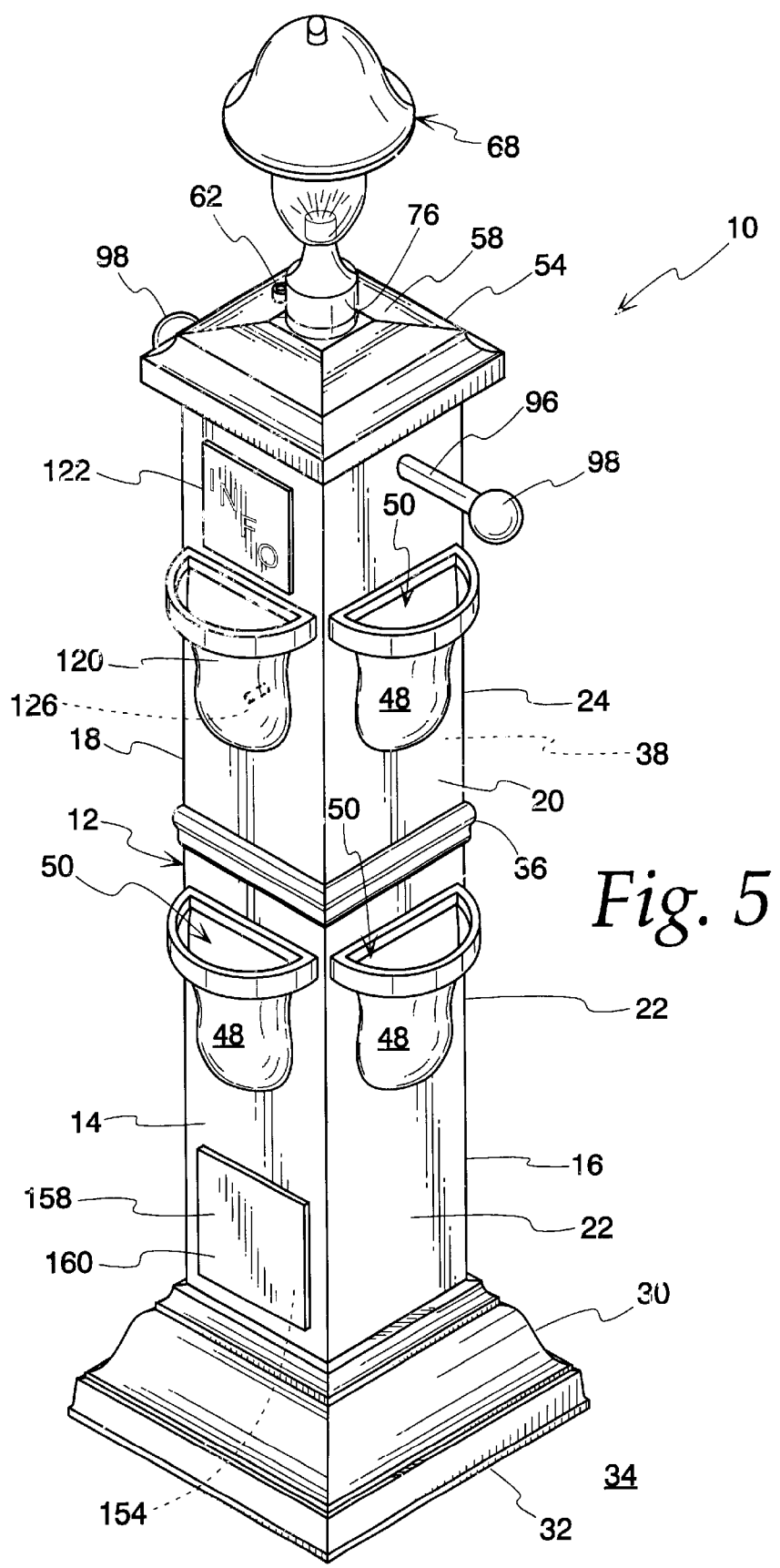
FIG. 5 is a view as in FIG. 1 with an ashtray and a smaller plaque substituted for the upper informational plaque shown in FIG. 1.

In FIG. 4, a second elongate bar 100 is shown which can be substituted for the bar 96. The bar 100 is longer than the bar 96. By removing one of the end caps 98, the bar 96 can be slid out of the operative position and fully separated from the mounting post base 10. The bar 100 can be slid in place in its stead. By reason of its length, the bar 100 can be projected a substantial distance from the side surface 20. In this embodiment, the bar 100 has spaced hooks 102 thereon to engage mounting rings 104 on a plaque 106. In this case, the plaque 106 has oppositely facing display surfaces 108, 110, on which information at 112, in the form of words, numbers, logos, pictures, can be selectively applied. The plaque 106 could have the fixed form shown or could be in the form of a flag or banner.

The front surface 14 of the mounting post base 10, as seen in FIGS. 1, 4, 5, 6, 10 and 11, lends itself to the selective mounting of a larger informational plaque 116, a mail box 118 carried on a support arm 119, an ash tray 120, a smaller informational plaque 122, and a processor 124 with data that can be selectively accessed by a user at the mounting post base 10.

The processor 124 may be operable by a touch screen 125. As one example, information relating to a builder, a development, etc. could be made available. Alternatively, directional or tourist information might be provided, potentially in multiple languages.

Each of the larger information plaque 116, mail box 118, ash tray 120, smaller information plaque 122, and processor 124 has one or more, strategically located mounting bolts 126 projecting therefrom and having a length sufficient to extend through the front surface 14 and into the hollow chamber 38. The peripheral wall structure 12 may have pre-drilled bores 128 to accommodate the mounting bolts 126. Nuts 130 can be threaded to the mounting bolts 126 accessed through an opening 132 in the peripheral wall structure 12 at the rear thereof.

In FIG. 10, the larger informational plaque 116 is modified to include an illumination source 134, which illuminates information applied to the front surface 136 thereof. In the event of a solar powered system, the illumination source 134 can be electrically connected to the solar collector 88 through wire 138.

In FIG. 4, a ring-shaped anchoring element 140 is provided on the side surface 20. An elongate flexible element, such as a rope or cord (not shown), can be tied to the anchoring element 140 and stretched to an anchoring element 140 on a like mounting post base 1.0 or other suitable structure, as to provide a barricade.

As seen in FIG. 4, a voice/sound transmitter/receiver 142 can be provided on the mail box 118 at 142 for generating a signal to a location remote from the mounting post base 10. In this case, the transmitter 142 has a push button actuator 144.

An optional, and preferably removable, shelf 146 can be mounted within the hollow chamber 38. The shelf 146 has a support surface 148 for a receptacle 150 that can be selectively placed into the hollow chamber 38 for placement on the shelf 146, and removed therefrom. The receptacle 150 can be used for temporary storage of a variety of different usable objects, or may be usable to accumulate waste.

A repositionable closure element 152 is provided and is movable selectively between a closed position, wherein it blocks the opening 132, and an open position, as shown in FIG. 11, wherein the receptacle 150, or other objects, can be directed into, and removed from, the hollow chamber 38 through the access opening 132.

An optional, lower, sub-chamber 154 is provided to store any of a number of different objects, such as a stack of business cards 156, as shown in FIG. 7. Alternatively, the sub-chamber 154 functions to receive functional components associated with the mounting post base 10. In FIG. 10, the sub-chamber 154 is used as a receptacle for at least part of the solar collector 88.

The sub-chamber 154 is selectively exposed and blocked by a closure element 158, which has an exposed surface 160, upon which further informational material at 162, of the nature previously described, may be applied.

In FIG. 4, an illumination accessory is shown consisting of an illumination source 164 which is at the distal end of a flexible element 166, which is reconfigurable. This allows light from the illumination source 164 to be selectively directed at different areas around the mounting post base 10, as at the plaque 106.

In FIG. 4, a sensor assembly is shown at 168 on the mounting post base surface 20 having a sensor element 170 which is capable of detecting the presence of an object in the vicinity of the mounting post base 10. For example, the sensor element 170 may detect motion, the breaking of a light beam, pressure applied to an element on the ground in the vicinity of the mounting post base 10, etc.

Figure 13:
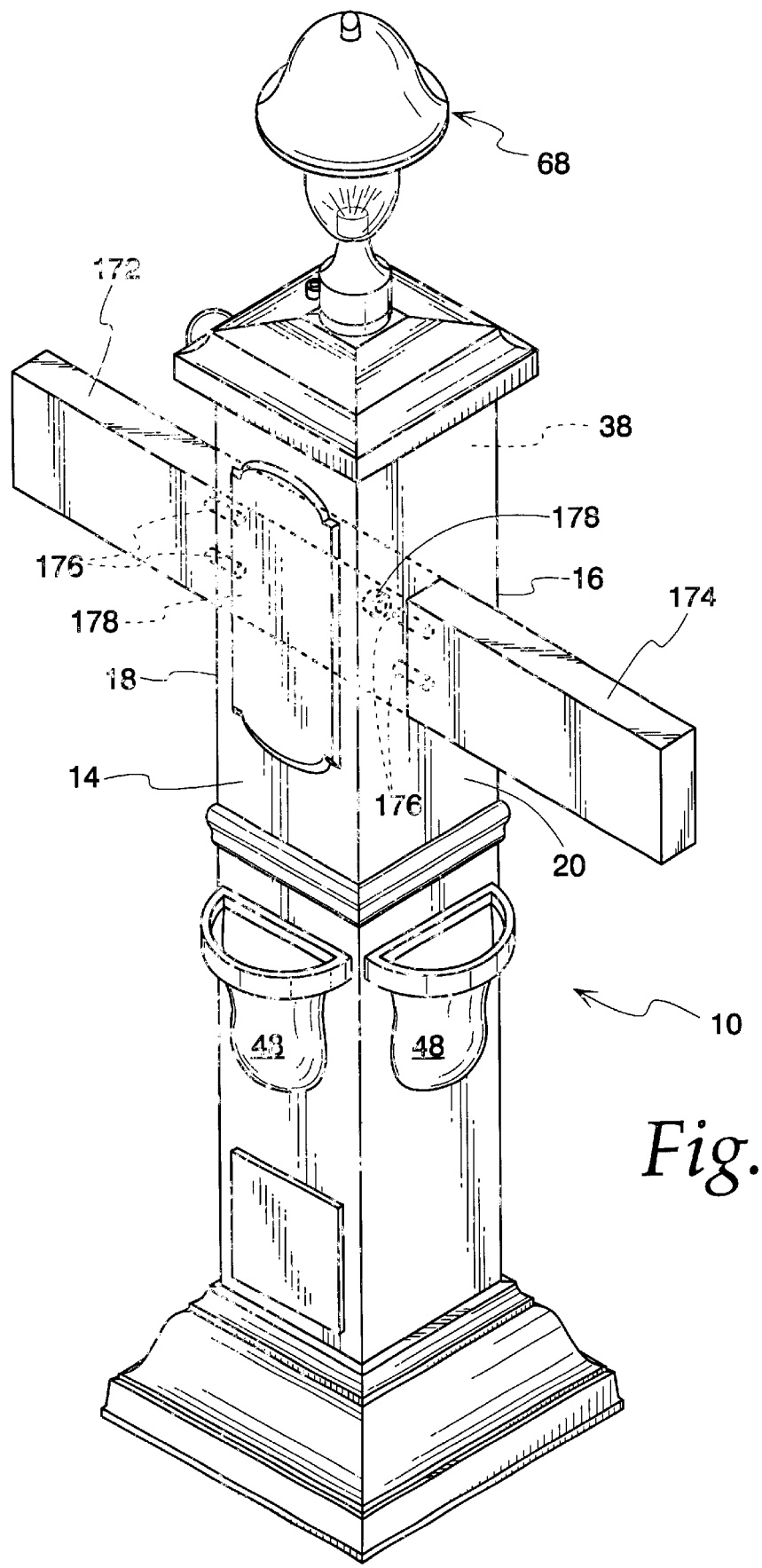
FIG. 13 is a perspective view of the mounting post base as in FIG. 1 with arm parts substituted for foliage planters in the mounting post base to produce in conjunction with the mounting post base a crucifix shape.

In FIG. 13, a further accessory is shown consisting of first and second arms 172, 174, attached to and projecting in cantilever fashion from, oppositely facing side surfaces 18, 20, respectively. To facilitate mounting, mounting bolts 176 may be provided on each arm to be secured by nuts 178 installed from within the hollow chamber 38.

In this configuration, the planters 48 are absent. Either the mounting post base 10 may be constructed without the planters 48 on the surfaces 18, 20, or the planters 48 can be removably mounted, as by bolts (not shown) using the same openings in the surfaces 18, 20 as accommodate the bolts 176.on the arms 172, 174. With this latter arrangement, the design can be changed by using selectively the planters 48 or the arms 172,174.

With the arms 172,174 in the operative position of FIG. 13, the arms 172, 174, in conjunction with the mounting post base 10, define a crucifix shape, permitting the structure to be utilized as in a cemetery environment, or elsewhere for religious purposes.

It is also possible to form the arm structure as one piece 178, which extends fully through the mounting post base 10.

Figure 12:
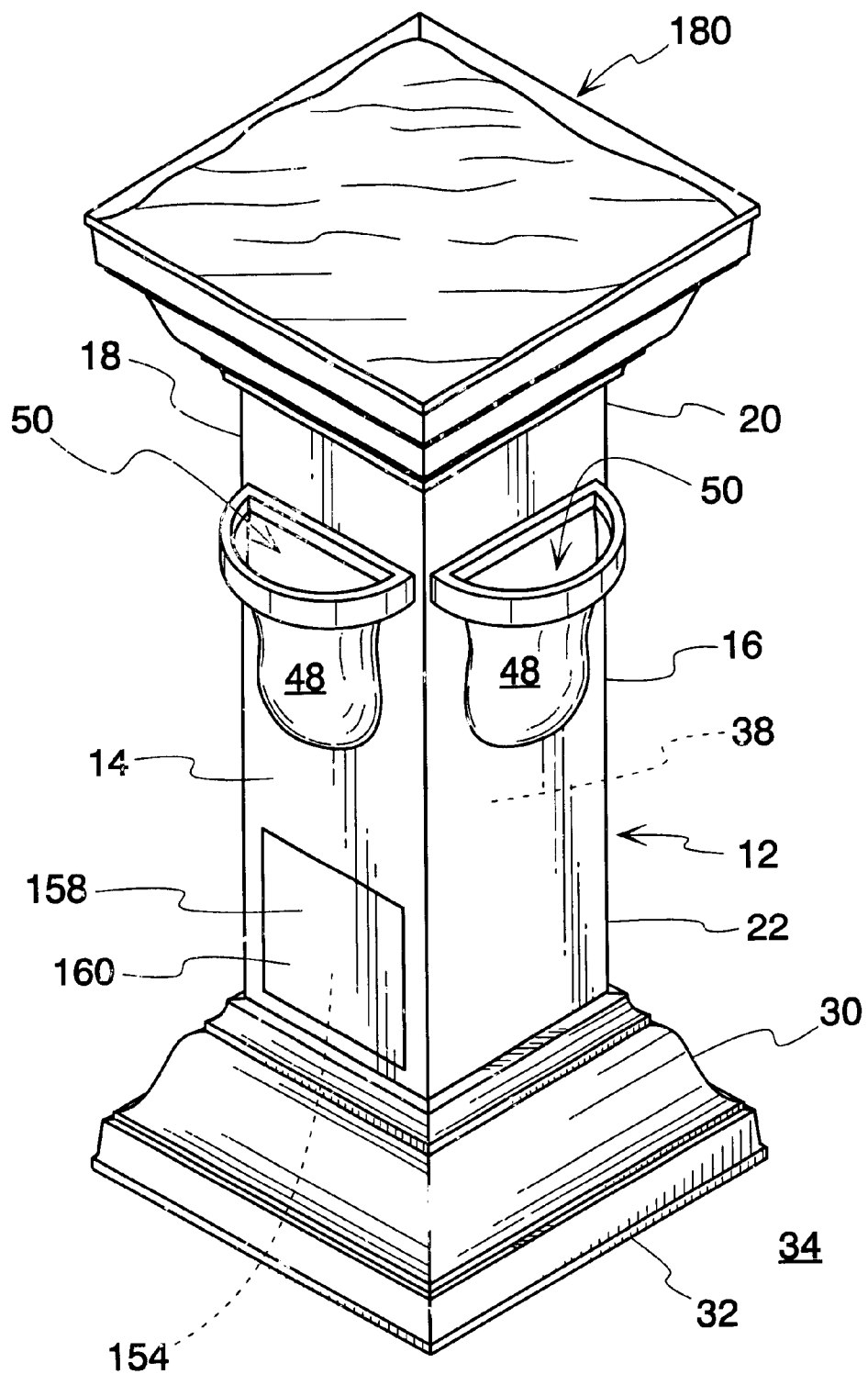
FIG. 12 is a perspective view of the mounting post base as in FIG. 1 with the top portion thereof removed and replaced by a bird bath accessory.

By separating the lower and upper mounting post base parts 22, 24, the lower mounting post base part 22 can be independently used, as shown in FIG. 12. In FIG. 12, a bird bath 180 is fit surroundingly over the upper edge 28 in its operative position.

Figure 6:
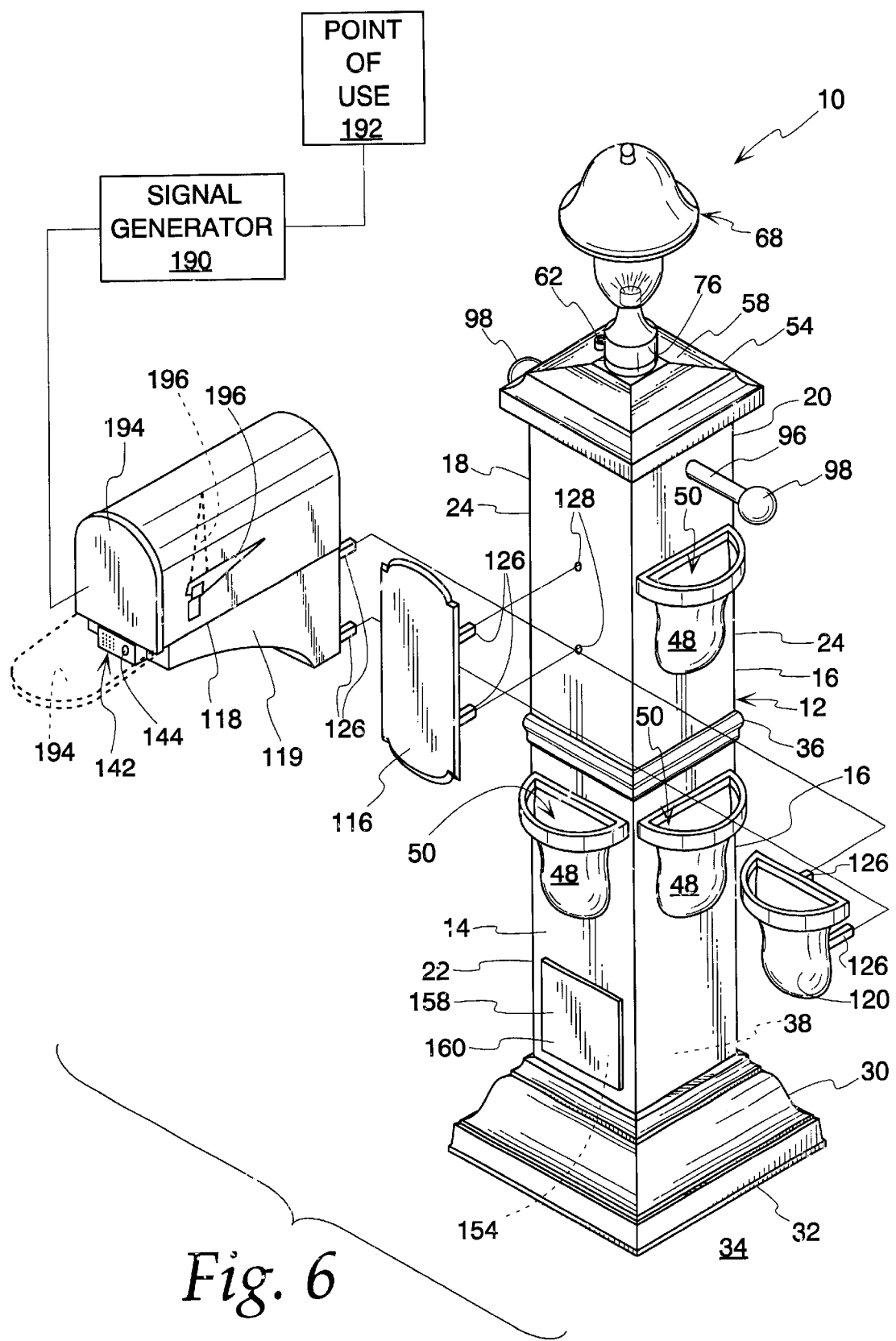
FIG. 6 is an exploded, perspective view of the mounting post base in FIG. 1 showing the interchangeable mail box, upper informational plaque, and ashtray.
Figure 8:
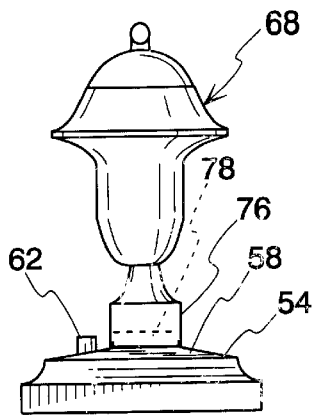
FIG. 8 is an enlarged, side elevation view of the top of the mounting post base with the illumination source in an operative position thereon.

Another option is shown in FIG. 6 for alerting a user to the receipt of mail in the mailbox 118. More specifically, a signal generator 190 is provided for producing a signal to a remote location, identified as a point of use 192. The point of use 192 may be a home, or other location.

The signal generator 190 is caused to produce the signal to the point of use 192 by one of two different occurrences. First, the signal may be produced as an incident of a door 194 on the mailbox 118 being moved from the closed position, shown in solid lines in FIG. 6, to the open position, shown in phantom lines. Also, movement of a marker 196 between the solid line position and upright position causes the signal generator 190 to produce an appropriate signal to the point of use 192. A marker such as that shown in FIG. 6 is commonly incorporated into rural mailboxes and is routinely repositioned by a mail delivery person to alert the resident of the mail delivery.

Another aspect of the invention is the incorporation of a communication system, as shown in FIG. 1, for sensing, as by motion detection or otherwise, the presence of a person or object, and communicating a message as an incident of sensing the presence of the person or object in the vicinity of the mounting base 10. In FIG. 1, a sensing device 200 is shown which is responsive to motion and which triggers operation of a speaker system 202 which projects an audible, prerecorded message 204. The nature of the message may vary greatly depending upon the environment in which the invention is used. For example, the message could be a greeting, informational material, etc.

The mounting post base 10 and the various accessories can be made from any of a number of different materials. For example, the mounting post base 10 may be made from plastic, fiberglass, wood, metal, or a composite. The inventor has found that polyethylene and "Faux stone" plastic, which is polyester resin, are highly suitable for use in constructing the mounting post base 10. The shape of the mounting post base 10 make it suitable for construction by a molding process using these materials.

The structure is utilizable in a number of different ways. For example, it can be used as a driveway marker, as a fence post, as a gate post, as a sign post, as a decorative planter, a bird bath, part of a barricade, a cemetery monument, etc.

The foregoing disclosure of specific embodiments is intended to be illustrative of the broad concepts comprehended by the invention.

What is claimed is:

1. In combination:

a mounting post base having an, a peripheral wall with an exposed, vertically extending peripheral surface, and a hollow chamber within the peripheral wall;

a receptacle at the external surface of the mounting post base;

a foliage in the receptacle and exposed to view outside of the receptacle;

a mail box on the mounting post base; and a first accessory, in addition to the mail box, mounted to the exposed vertically extending, peripheral surface, that performs a first independent function.

2. The combination according to claim 1 wherein the mounting post 19 base has a downwardly facing surface for engaging a subjacent surface to maintain the mounting post base in an operative position on the subjacent surface.

3. The combination according to claim 1 wherein the mail box is removably connectable to the mounting post base.

4. The combination according to claim 1 wherein the first accessory comprises an information plaque.

5. The combination according to claim 4 wherein the information plaque is removably connected to the mounting post base.

6. The combination according to either of claims 1 or 3 wherein the first accessory is removably connectable to the mounting post base.

7. The combination according to either of claims 1 or 6 wherein the first accessory is an information plaque.

8. The combination according to claim 1 wherein a flowable material is placed in the hollow chamber.

9. The combination according to claim 8 wherein the flowable material is at least one of gravel, fertilizer, sand, soil, and water.

10. In combination:

a mounting post base having an external surface, a peripheral wall, and a hollow chamber within the peripheral wall;

a receptacle at the external surface of the mounting post base;

foliage in the receptacle and exposed to view outside of the receptacle;

a first accessory on the mounting post base that performs a first function, wherein a mail box is removably connectable to the mounting post base, a second accessory that is removably connectable to the mounting post base, wherein the second accessory is an information plaque, wherein the information plaque and mail box are interchangeably and removably connected to the mounting post base at the same location.

11. In combination:

a mounting post base having an external surface, a peripheral wall, and a hollow chamber within the peripheral wall;

a receptacle for foliage at the external surface of the mounting post base; and a first accessory on the mounting post base that performs a first function, wherein the mounting post base comprises at least first and second releasably stackable parts that cooperatively bound at least a part of the hollow chamber.

12. In combination:

a mounting post base having an external surface, a peripheral wall, and a hollow chamber within the peripheral wall;

a receptacle at the external surface of the mounting post base;

foliage in the receptacle and exposed to view outside of the receptacle;

a first accessory on the mounting post base that performs a first function; and a reservoir for water within the peripheral wall and a conduit for communicating water from the reservoir to the hollow chamber.

13. In combination:

a mounting post base having an external surface, a peripheral wall, and a hollow chamber within the peripheral wall;

a receptacle at the external surface of the mounting post base;

foliage in the receptacle and exposed to view outside of the receptacle; and a first accessory on the mounting post base that performs a first function, wherein the hollow chamber is in communication with the receptacle.

14. The combination according to claim 13 wherein the foliage is live foliage and there is a supply of a planting medium extending from the hollow chamber continuously to the receptacle.

15. The combination according to claim 14 further comprising a reservoir for water within the peripheral wall and a conduit for communicating waterfrom the reservoir to the planting medium within the hollow chamber.

16. The combination according to either of claims 15 or 12 wherein the mounting post base has a top and bottom and the reservoir is defined by a wall structure which is exposed at the top of the mounting post base.

17. The combination according to claim 13 wherein the mounting post base comprises at least first and second releasably stackable parts that cooperatively bound at least a part of the hollow chamber.

18. The combination according to either of claims 1 or 13 further comprising a second accessory mounted to the mounting post base that performs a second independent function.

19. The combination according to claim 18 wherein the second accessory is an information plaque.

20. In combination:

a mounting post base having a height, a peripheral wall having a polygonal shape defining a plurality of exposed flat surfaces extending over the majority of the height of the mounting post base, and a hollow chamber within the peripheral wall;

a receptacle for foliage at the external surface of the mounting post base; and a mail box on the mounting post base, the base comprising an enlarged bottom portion defining a surface area that is larger than the peripheral shape of the mounting post to stably support the mounting post base on a subjacent surface without penetrating the subjacent surface.

21. The combination according to claim 20 further comprising a flowable material in the hollow chamber to add weight to and thereby stabilize the mounting post base.

22. The combination according to claim 21 wherein the enlarged bottom portion is hollow and contains a quantity of the flowable material.

23. The combination according to claim 20 further comprising an accessory in addition to the mail box at one of the plurality of exposed flat surfaces.

24. The combination according to claim 23 wherein the accessory comprises an information plaque.

25. In combination:
- a mounting post base having an external surface, a peripheral wall, and a hollow chamber within the peripheral wall; and
- a first accessory on the mounting post base that performs a first function,
- wherein the mounting post base comprises at least first and second releasably stackable parts that cooperatively bound at least a part of the hollow chamber.

26. The combination according to claim 25 wherein the first accessory comprises a mail box.

* * * * *

UNITED STATES PATENT AND TRADEMARK OFFICE
CERTIFICATE OF CORRECTION

PATENT NO. : 6,513,284 B1
DATED : February 4, 2003
INVENTOR(S) : Delbert E. Sandlin It is certified that error appears in the above-identified patent and that said Letters Patent is hereby corrected as shown below:

Column 9,
Line 8, delete "a".
Line 16, delete "19".

Column 10,
Line 33, delete "waterfrom" and insert -- water from -- therefor.

Signed and Sealed this

Twenty-first Day of October, 2003

JAMES E. ROGAN
*Director of the United States Patent and Trademark Office*